United States Patent
Wu et al.

(10) Patent No.: US 11,367,874 B2
(45) Date of Patent: Jun. 21, 2022

(54) METAL-SUBSTITUTED METAL OXIDE MATERIALS FOR LITHIUM ION BATTERIES

(71) Applicant: NORTHWESTERN UNIVERSITY, Evanston, IL (US)

(72) Inventors: Jinsong Wu, Wilmette, IL (US); Vinayak P. Dravid, Glenview, IL (US)

(73) Assignee: Northwestern University, Evanston, IL (US)

( * ) Notice: Subject to any disclaimer, the term of this patent is extended or adjusted under 35 U.S.C. 154(b) by 435 days.

(21) Appl. No.: 16/603,982

(22) PCT Filed: Apr. 13, 2018

(86) PCT No.: PCT/US2018/027482
§ 371 (c)(1),
(2) Date: Oct. 9, 2019

(87) PCT Pub. No.: WO2018/191615
PCT Pub. Date: Oct. 18, 2018

(65) Prior Publication Data
US 2020/0075949 A1     Mar. 5, 2020

Related U.S. Application Data

(60) Provisional application No. 62/485,435, filed on Apr. 14, 2017.

(51) Int. Cl.
*H01M 4/00*     (2006.01)
*H01M 4/525*     (2010.01)
(Continued)

(52) U.S. Cl.
CPC ....... *H01M 4/525* (2013.01); *H01M 10/0525* (2013.01); *H01M 10/44* (2013.01); *H01M 2004/021* (2013.01); *H01M 2004/027* (2013.01)

(58) Field of Classification Search
CPC ...... H01M 4/525; H01M 4/364; H01M 4/131; H01M 2004/021; H01M 2004/027; H01M 10/052; B82Y 30/00
See application file for complete search history.

(56) References Cited

U.S. PATENT DOCUMENTS 8,182,786 B2 * 5/2012 O'Brien ................. A61Q 19/08
                                                               423/632
9,647,275 B2    5/2017   Serov et al.
(Continued)

FOREIGN PATENT DOCUMENTS

| CN | 106229165 A | * | 12/2016 |
| CN | 106898744 A | * | 6/2017 |
| CN | 106115805 B | * | 10/2017 |

OTHER PUBLICATIONS

The International Search Report and Written Opinion dated Jun. 21, 2018 for International Application No. PCT/US2018/027482, pp. 7 pages.
(Continued)

*Primary Examiner* — Naum Levin
(74) *Attorney, Agent, or Firm* — Bell & Manning, LLC

(57) ABSTRACT

Provided is a Li+battery comprising an anode comprising an anode active material comprising a plurality of transition metal ($TM_1$)-substituted binary transition metal ($TM_2$) oxide nanocrystals, a cathode in electrical communication with the anode, a separator between the anode and the cathode, and an electrolyte in contact with the anode and the cathode. The anode active material, in a lithiated state, is characterized by a three-dimensional network of the $TM_1$ and nanoparticles of $Li_2O$ and nanoparticles of the $TM_2$, both types of nanoparticles distributed throughout the network. In a delithiated state, the anode active material is characterized by the network of the $TM_1$ and nanoparticles of an oxide of the $TM_1$ and nanoparticles of an oxide of the $TM_2$, both types of
(Continued)

nanoparticles distributed throughout the network. The $TM_1$-substituted binary $TM_2$ oxide may be characterized by a ratio of $TM_2/TM_1$ of at least about 5.

15 Claims, 11 Drawing Sheets

(51) Int. Cl.
*H01M 10/0525* (2010.01)
*H01M 10/44* (2006.01)
*H01M 4/02* (2006.01)

(56) References Cited

U.S. PATENT DOCUMENTS

| | | | |
|---|---|---|---|
| 2012/0003533 A1 | 1/2012 | Dahn et al. | |
| 2016/0218341 A1 | 7/2016 | Kumar et al. | |
| 2017/0098843 A1* | 4/2017 | Manthiram | H01M 4/9016 |
| 2019/0002282 A1* | 1/2019 | Tamimi Marino | A61L 27/54 |

OTHER PUBLICATIONS

Liu et al., "Facile synthesis of NiCo2O4 nanorod arrays on Cu conductive substrates as superior anode materials for high-rate Li-ion batteries," CrystEngComm, vol. 15, Issue 8, 2013 (retrieved on Jun. 7, 2018). Retrieved from the Internet: URL: http://dro.deakin.edu.au/view/DU: 30053625>. Abstract.

Niu et al., "Hierarchically Porous $CuCo_2O_4$ Microflowers: a Superior Anode Material for Li-ion batteries and a Stable Cathode Electrocatalyst for Li—$O_2$ Batteries," Electrochimica Acta, vol. 208, Aug. 1, 2016 [retrieved on Jun. 7, 2018], Retrieved from the Internet: <URL: https://www.sciencedirect.com/science/article/pii/S0013468616310726>. Abstract.

Liu et al., "Origin of Fracture-Resistance to Large Volume Change in Cu-Substituted $Co_3O_4$ Electrodes," Adv Mater., vol. 30, No. 4, Jan. 2018, [retrieved on Jun. 7, 2018]. Retrieved from the Internet: <URL: https://www.ncbi.nlm.nih.gov/pubmed/29210479>. Abstract.

Jadhav et al., "Hierarchical Mesoporous 3D Flower-like $CuCo_2O_4$/NF for for High-Performance Electrochemical Energy Storage," Scientific Reports, vol. 6, 31120, DOI: 10.1038/srep31120 (2016), pp. 1-12.

Ning et al., "Spinel $CuCo_2O_4$ nanoparticles supported on N-doped reduced graphene oxide: a highly active and stable hybrid electrocatalyst for the oxygen reduction reaction," Langmuir vol. 29, pp. 13146-131515 (2013).

Kang et al, "Porous $CuCo_2O_4$ nanocubes wrapped by reduced graphene oxide as high-performance lithium-ion battery anodes," Nanoscale, vol. 6, pp. 6551-6556 (2014).

Nikolov et al, "Electrocatalytic activity of spinel related cobalties $M_xCo_{3-x}O_4$ (M = Li, Ni, Cu) in the oxygen evolution reaction," Journal of Electroanalytical Chemistry, vol. 429, No. 1, pp. 157-168, May 1997.

* cited by examiner

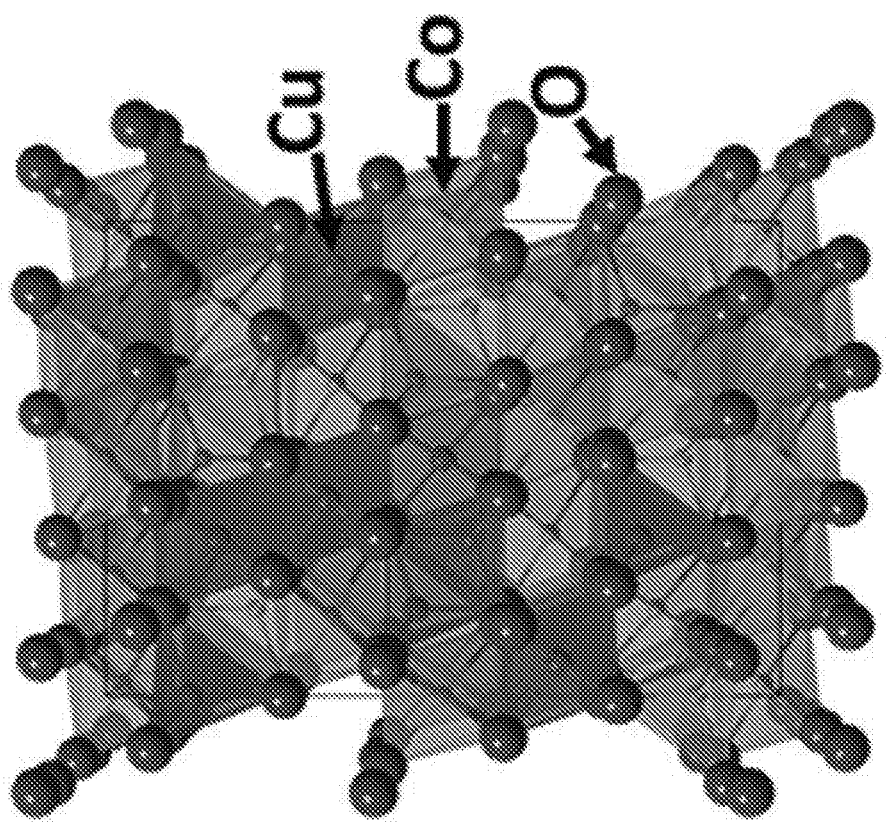

METAL-SUBSTITUTED METAL OXIDE MATERIALS FOR LITHIUM ION BATTERIES

CROSS REFERENCE TO RELATED APPLICATIONS

This application is a National Stage of International Application No. PCT/US2018/027482, filed Apr. 13, 2018, which claims the benefit of U.S. Provisional Patent Application No. 62/485,435, filed Apr. 14, 2017, the contents of which are herein incorporated by reference.

BACKGROUND

Traditional Li-ion battery electrodes, such as graphite[1], and $Li_2MnO_4$[2] and $LiCoO_2$[3] operate by intercalation reactions alone and typically release and reaccommodate between 0.5 and 1.0 $Li^+$ ions per transition metal ion, thereby limiting the delivered electrode capacity to about 100-170 mAh/g. On the other hand, conversion and alloying reactions occur when electrode materials, such as metal oxides,[4] elemental Si, Sn,[5] S,[6] and Se[7] are extensively lithiated and are appealing because they can involve more Li per effective element, resulting in significantly higher capacities. However, unlike intercalation/deintercalation reactions, conversion and alloying reactions induce large volume changes during charge/discharge cycles that often lead to fracture and loss of electrical contact, among other deleterious mechanical effects of volume change.[7a, 8] The resulting loss of electrical contact to active electrode materials is one of the main causes of capacity loss and reduced Coulombic efficiency. In addition, most electrode materials for conversion and alloying reactions are semiconductors (and even insulators) that possess relatively low electronic conductivity. Thus, improved electrical conductivity would also improve the prospects of conversion and alloying reaction materials in Li-ion and related battery applications.

SUMMARY

Provided are anode active materials for lithium ion batteries and lithium ion batteries incorporating the anode active materials.

In one aspect, lithium ion batteries are provided. In an embodiment, such a battery comprises an anode comprising an anode active material comprising a plurality of transition metal ($TM_1$)-substituted binary transition metal ($TM_2$) oxide nanocrystals, a cathode in electrical communication with the anode, a separator between the anode and the cathode, and an electrolyte in contact with the anode and the cathode. The anode active material, in a lithiated state, is characterized by a three-dimensional network of the $TM_1$ and nanoparticles of $Li_2O$ and nanoparticles of the $TM_2$, both types of nanoparticles distributed throughout the network. In a delithiated state, the anode active material is characterized by the network of the $TM_1$ and nanoparticles of an oxide of the $TM_1$ and nanoparticles of an oxide of the $TM_2$, both types of nanoparticles distributed throughout the network. The $TM_1$-substituted binary $TM_2$ oxide may be characterized by a ratio of $TM_2/TM_1$ of at least about 5.

In another aspect, methods of using the present lithium ion batteries are provided. The methods comprising charging and discharging the battery.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the present disclosure will hereafter be described with reference to the accompanying drawings.

FIGS. 1A-1F show the results of the characterization of a Cu-substituted $Co_3O_4$ ($Cu_{3/7}Co_{18/7}O_4$) single crystal sample. FIG. 1A shows a 20 kV scanning electron microscope (SEM) image. FIG. 1B shows an X-ray powder diffraction spectrum. FIG. 1C shows a bright-field scanning transmission electron microscope (STEM) image along with the selected area electron diffraction (SAED) results. FIG. 1D shows the STEM-energy-dispersive X-ray spectroscopy (EDS) mapping, including Co, Cu and O maps. FIG. 1E shows the atomic structure of the nonordered Cu-substituted $Co_3O_4$ material, wherein Cu randomly occupies $T_d$ or $O_h$ sites. FIG. 1F shows the electrochemical cycling performance of the material and of unsubstituted $Co_3O_4$ at a current density of 0.1 A $g^{-1}$.

FIG. 2A shows a pristine, single-crystal Cu-substituted $Co_3O_4$ nanoparticle with hexagonal shape oriented closed to the [110] zone axis (the diffraction pattern is shown as an insert). FIG. 2B shows the nanoparticle after lithiation, revealing the development of a polycrystalline morphology consisting of $Li_2O$, metal Cu and Co as determined by the inserted electron diffraction. Results which were obtained but are not shown include a Z-contrast STEM image of the lithiated nanoparticle, with an EELS (electron energy loss spectroscopy) spectrum showing both O and Co edges. Other data include nanobeam electron diffraction of the lithiated Cu-substituted $Co_3O_4$, which showed single-crystal like diffraction spots of $Li_2O$ and Cu, and diffuse arcs of Co (data not shown). The Cu {111} lattice plane was parallel to the {111} of $Li_2O$. Other data include a high-resolution electron microscope (HREM) image of the lithiated Cu-substituted $Co_3O_4$, which showed large Cu and $Li_2O$ crystals on which small Co nanoparticles are formed (data not shown). Other data include EELS maps of Co, O and Co+O along with its Z-contrast STEM image of the lithiated Cu-substituted $Co_3O_4$, confirming the presence of Co nanoparticles (data not shown).

FIGS. 3A-3D show in-situ TEM images showing the movement of the reaction front along with the resulting volumetric expansion of the nanoparticle. Other data obtained but not shown include in-situ HREM images of the reaction interface showing the formation of intermediate and intercalated phases and the formation of large $Li_2O$ and Cu crystals and Co-nanoparticles at the few nanometer scale. The {220} lattice spacing was identified by Fourier transformation. Other results include models of the intermediate and intercalated phases in the lithiation of Cu-substituted $Co_3O_4$ using the Cu:Co ratio as 1:5 for the simplicity of supercell generation in density functional theory (DFT) calculations (not shown).

FIG. 4A shows a TEM image of the delithiated Cu-substituted $Co_3O_4$ showing that the rhombohedral shape with straight facets is well kept after delithiation. FIG. 4B shows the SAED pattern of the delithiated particle showing CoO diffraction rings along with some sharp spots from large crystals. FIG. 4C shows X-ray photoelectron spectroscopy (XPS) spectra of lithiated and delithiated Cu-substituted $Co_3O_4$ samples showing Cu and Co peaks. The oxidation of Co and partial oxidation of Cu in delithiation were confirmed. FIGS. 4D and 4E provide a schematic illustration of the reversible structural and chemical changes which take place during the charge (FIG. 4D) and discharge (FIG. 4E) cycles. Other data which were obtained but not shown include a nanobeam electron diffraction pattern showing large spots which are from Cu and CuO crystals. Other data include in-situ TEM images which show the movement of the reaction front along with volumetric expansion (data not shown). Data also include an HREM image of the delithiated sample showing CoO nanoparticles on the substrate of Cu and CuO (data not shown). Data also include a Z-contrast STEM image, a Co map and a Cu map of the delithiated sample (data not shown). CoO clusters appeared as bright spot in the STEM images. Results also include a comparison of experimental and DFT simulated voltage profiles for the first cycle of lithiation and delithiation and a comparison of experimental and DFT simulated voltage profiles for the following cycles of lithiation and delithiation (not shown).

DETAILED DESCRIPTION

Figure 1A:
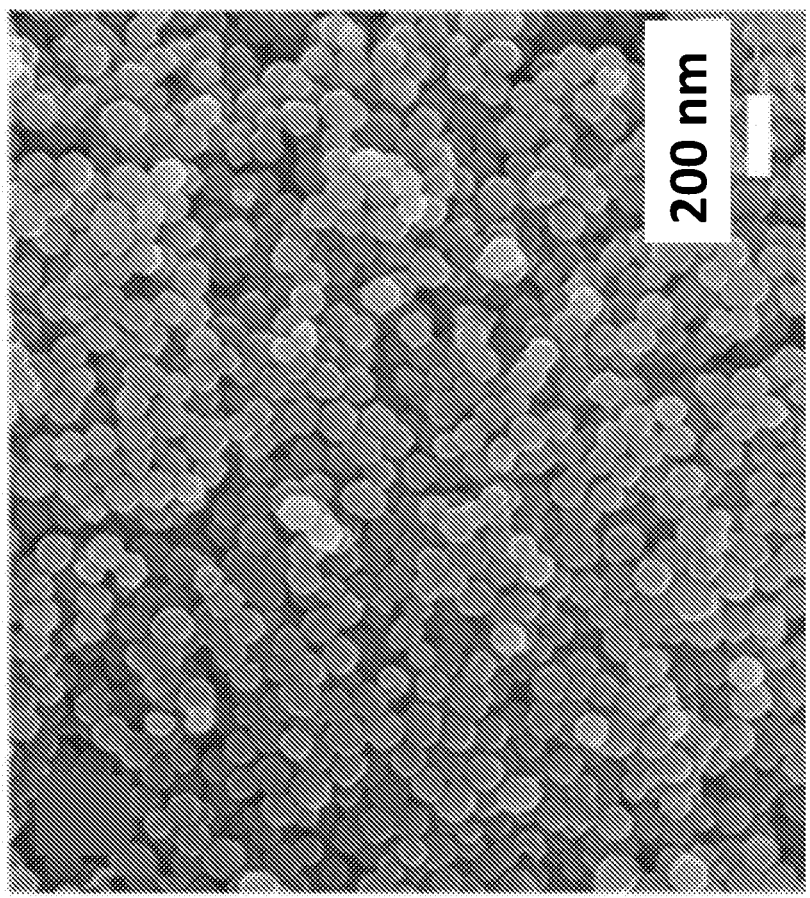

Provided are anode active materials for lithium ion batteries and lithium ion batteries incorporating the anode active materials. In at least some embodiments, the anode active materials exhibit improved cyclic stability as well as higher capacities as compared to conventional anode active materials. In at least some embodiments, the anode active materials are significantly less susceptible to mechanical fractures, structural pulverization and loss of contact with the electric collector of $Li^+$ ion batteries. By way of illustration, it has been found that by incorporating even a very small amount of Cu into the lattice of spinel $Co_3O_4$, a dynamic framework composed of ultrathin flakes of metal Cu can be formed which extends throughout the ternary Cu-substituted $Co_3O_4$ material. This dynamic framework provides a highly-conductive support which can endure large volume changes caused by lithiation/delithiation cycles, thereby achieving cycling stability while also maintaining high capacity. Results for the illustrative ternary Cu-substituted $Co_3O_4$ material, $Cu_{3/7}Co_{18/7}O_4$, are further described in the Example, below.

The anode active materials are made by incorporating (e.g., doping) a metal element into a metal oxide compound. In the present disclosure, the metal element which is incorporated into the metal oxide compound may be referred to as the "substituent metal." The metal oxide may be a binary metal oxide, i.e., a compound of a metal and oxygen. The metal of the metal oxide may be a transition metal, e.g., a 3d transition metal such as Cr, Mn, Co, Fe, Cu or Ni. The metal oxide may be selected on the basis of its ability to undergo lithiation reactions and delithiation reactions analogous to those shown in Equations (1) and (2) below.

$$M_xO_y + 2yLi^+ + 2ye^- \rightarrow xM_0 + yLi_2O \quad (1)$$

$$xM_0 + yLi_2O \rightarrow M_xO_y + 2yLi^+ + 2ye^- \quad (2)$$

The metal oxide may be a metal oxide having a spinel structure. An illustrative binary transition metal oxide is cobalt oxide, e.g., $Co_3O_4$. Others include, but are not limited to, $Fe_3O_4$, $Fe_2O_3$, $MnO_2$, NiO, CuO, CoO, etc.

The metal element incorporated into the metal oxide to form the anode active material, i.e., the substituent metal, is different from the metal of the metal oxide compound. However, the substituent metal may be another transition metal, e.g., a 3d transition metal such as Cr, Mn, Co, Fe, Ni or Cu. The substituent metal may be selected on the basis of its conductivity, ductility, and malleability. Metal elements that are highly conductive, ductile and malleable are particularly useful, e.g., Cu.

Like the metal oxide compound, the anode active material (i.e., the metal-substituted metal oxide) may be characterized as being capable of undergoing the lithiation/delithiation reactions described above. An illustrative anode active material is Cu-substituted $Co_3O_4$. The amount of the substituent metal being incorporated into the metal oxide may vary. This amount may be quantified as a ratio of the metal of the metal oxide/substituent metal (e.g., Co/Cu in Cu-substituted $Co_3O_4$). Such ratios may be measured via EDS as described in the Example, below. The ratios may be reported as an average ratio as measured from a representative number of nanocrystals of the anode active material.

The amount/ratio of the metal of the metal oxide/substituent metal may be selected to achieve the formation of a three-dimensional (3D) network of the substituent metal upon lithiation of the anode active material. This 3D network is further described below. At the same time, the amount/ratio may be selected to achieve a desired (e.g., maximum) capacity for a $Li^+$ battery incorporating the anode active material. As noted above and further described in the Example below, it has been found that even very small amounts of a substituent metal can form the 3D network and provide $Li^+$ batteries which exhibit both high cycling stabilities and high capacities. By way of illustration, in embodiments, the anode active material is $Cu_{3/7}Co_{18/7}O_4$ in which the ratio of Co/Cu is about 6. In embodiments, the ratio of metal of the metal oxide/substituent metal is at least about 5, at least about 6, at least about 7, at least about 8, at least about 9, at least about 10, or in the range of from about 5 to about 10. With respect to the ratio of metal of the metal oxide/substituent metal, the term "about" means within ±10% in the present disclosure.

Figure 1B:
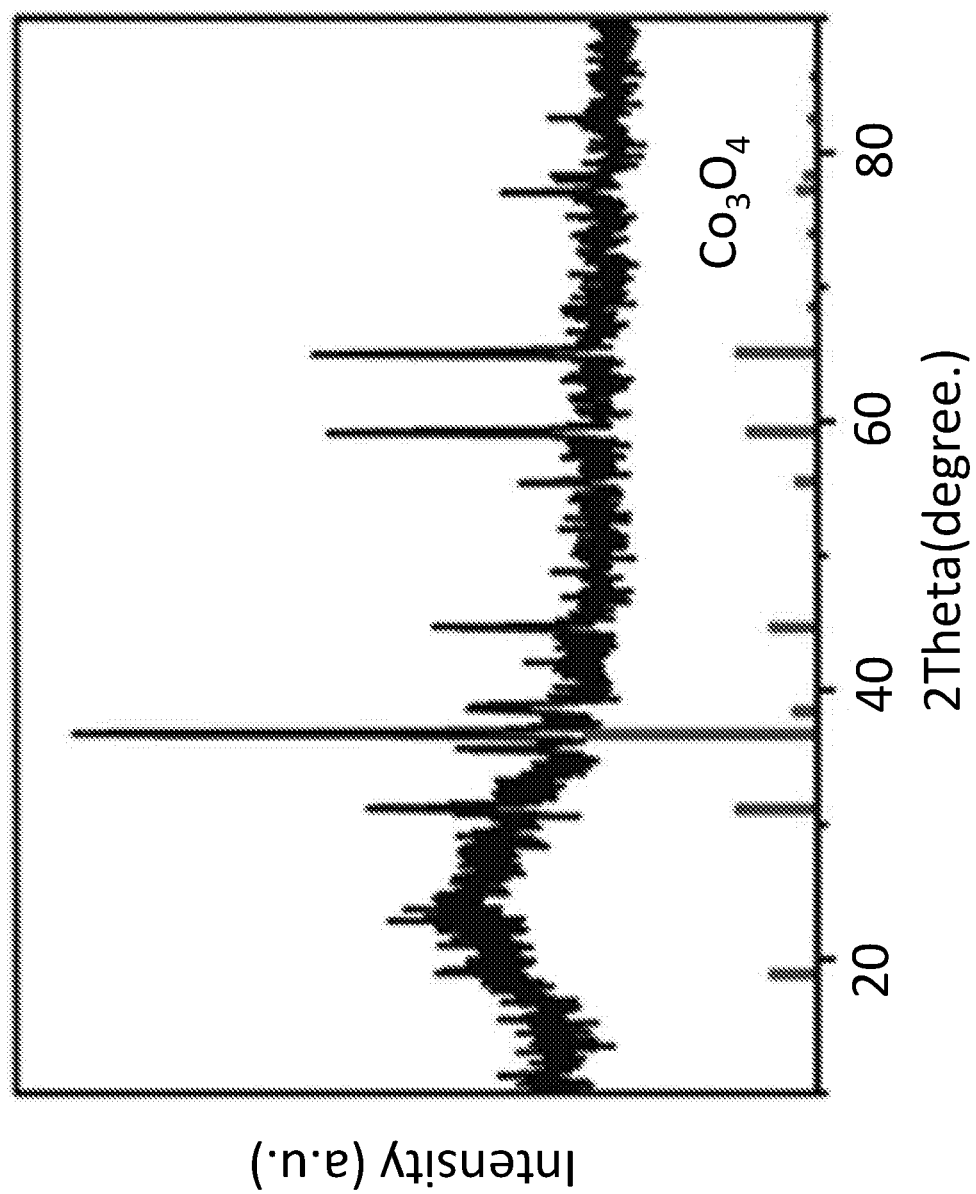
Figure 1C:
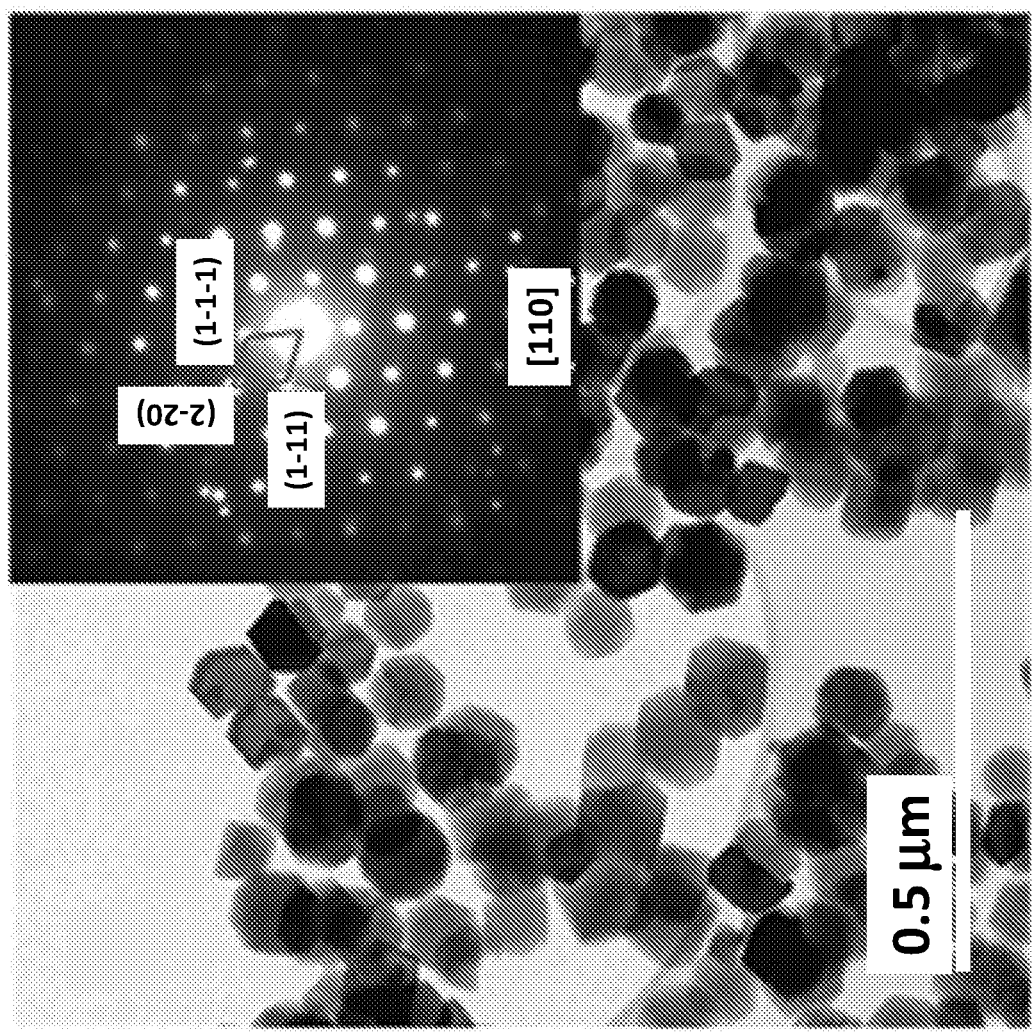
Figure 2B:
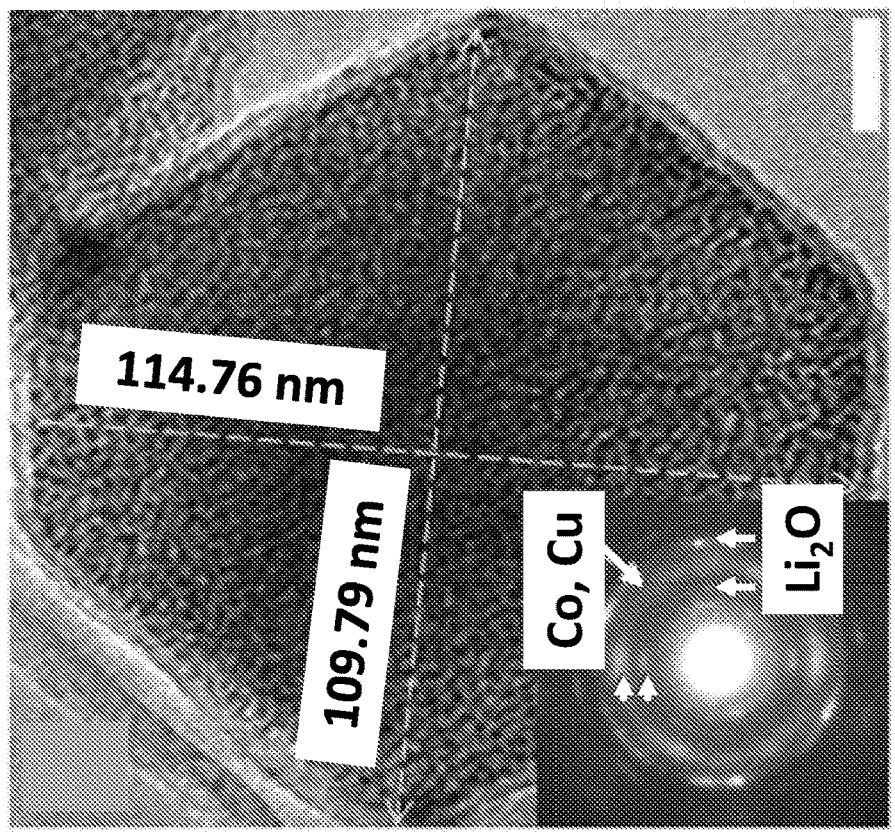
FIGS. 2A-2B illustrate the lithiation of Cu-substituted $Co_3O_4$ material as studied by in-situ TEM.
Figure 2A:
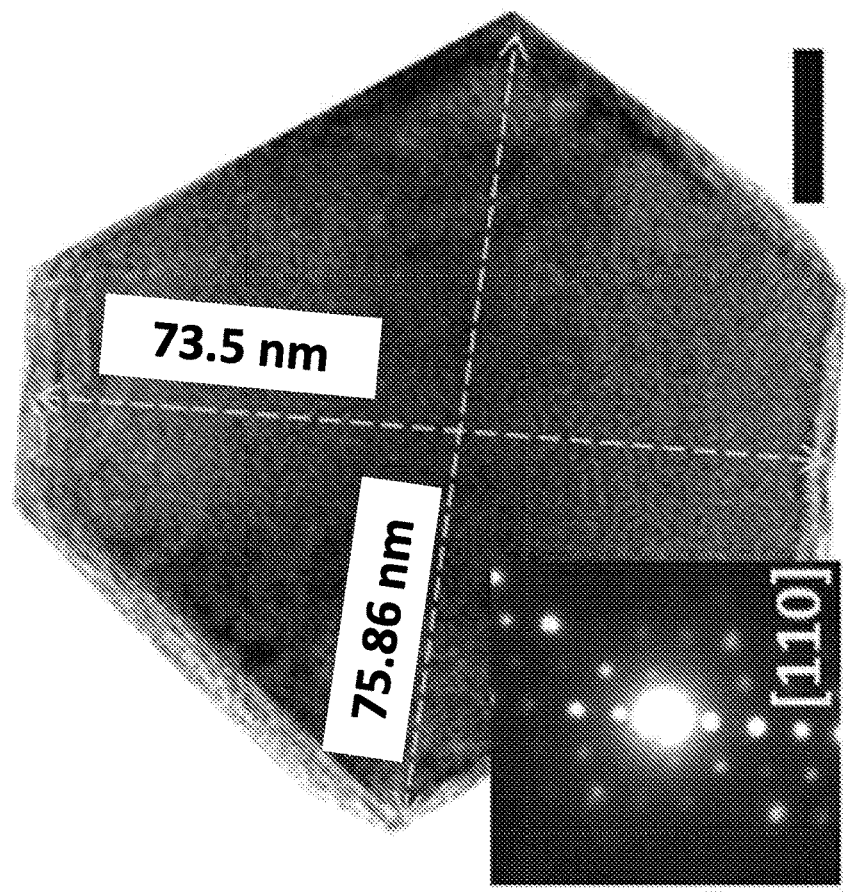
Figures 3A, 3B, 3C, 3D:
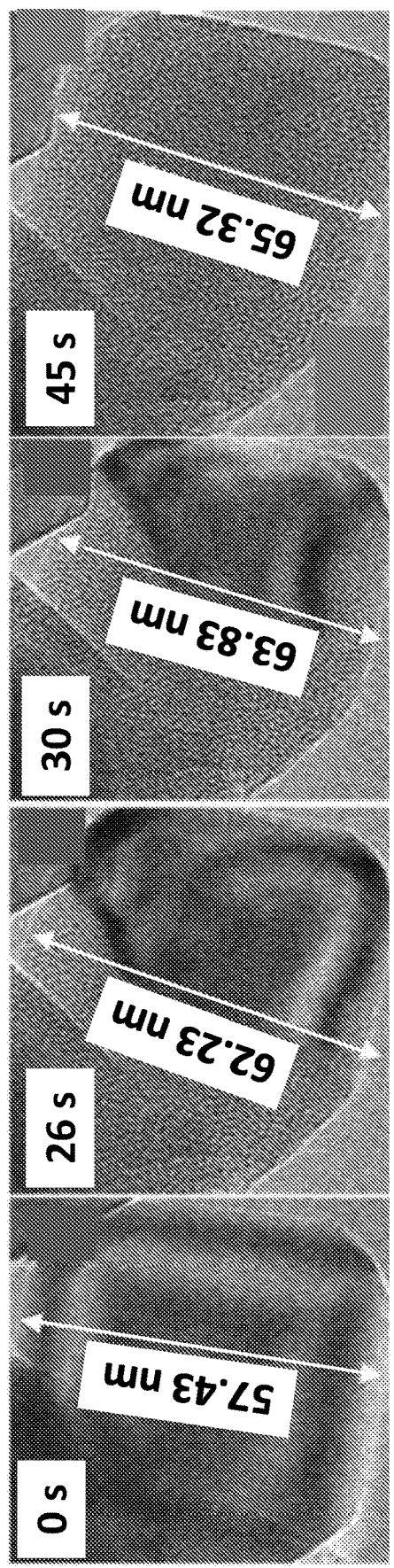
FIGS. 3A-3D illustrate the reaction front of the lithiation of a Cu-substituted $Co_3O_4$ nanoparticle as studied by in-situ HREM. In particular.

The anode active material may be characterized by its morphology in a pristine state, i.e., prior to undergoing lithiation/delithiation. The anode active material may be in the form of hexagonal shaped nanocrystals. By "hexagonal" it is meant that a cross-section of the nanocrystal (as determined from an SEM or TEM image) has six distinct edges arranged in the shape of a hexagon. However, the length of each edge need not be exactly the same. In addition, although edges generally meet at sharp corners, some nanocrystals may have rounded corners. An illustrative anode active material composed of hexagonal shaped nanocrystals is shown in FIGS. 1A, 1C, and 2A. The size of the nanocrystals, quantified as the maximum edge-to-edge width across the nanocrystal, may be no more than about 150 nm, or no more than about 100 nm, or in the range of from about 25 nm to about 200 nm. The size may be an average size as reported from a representative number of nanocrystals and as measured from TEM images. (See FIG. 2A.) Hexagonal shaped nanocrystals provide an indication of the quality of the nanocrystals. This includes the crystallinity of the nanocrystals (i.e., single-crystalline) and uniformity of composition of the nanocrystals (e.g., uniform distribution of the substituent metal). In addition, hexagonal shaped nanocrystals ensure that electrolyte in the $Li^+$ battery is exposed to a specific lattice plane, e.g., {111} for a cubic structure, of the anode active material.

The anode active material may be characterized by its crystallinity in the pristine state. The anode active material may be single-crystalline characterized by a single crystal phase. The single crystal phase may be the same crystal phase as the unsubstituted metal oxide compound. In embodiments, the single crystal phase is a spinel structure. Confirmation of single-crystallinity may be achieved via X-ray powder diffraction and comparison to the X-ray powder diffraction of the unsubstituted metal oxide. (See, e.g., FIG. 1B.) As noted above, existence of a hexagonal shape also indicates a single-crystalline material.

The anode active material may be characterized by its atomic structure and the nature of the distribution of the substituent metal throughout the metal oxide compound, i.e., throughout the lattice structure of the metal oxide. The substituent metal may be randomly and uniformly distributed throughout the lattice structure of the metal oxide. The substituent metal distribution may be verified using STEM-EDS mapping. (See, e.g., FIGS. 1D and 1E.) The distribution of the substituent metal described in this paragraph refers to the anode active material in its pristine state.

The anode active material may be combined with other materials to form the anode of a Li$^+$ ion battery. Such other materials include conductive carbon (e.g., carbon black) and a binder (e.g., poly vinylidene fluoride (PVDF)). However, in embodiments, the anode is free of a material such as graphene or graphene oxide. By "free" it is meant that the amount of the graphene/graphene oxide is zero or so small so as to have no material effect on the properties of the anode active material. In conventional anodes for Li$^+$ ion batteries, graphene/graphene oxide has often been used as a support material and to improve the performance of the Li$^+$ ion batteries. However, as further described in the Example, below, it has been found that the present anode active materials can achieve high capacity and cycling stability even without the presence of graphene/graphene oxide.

Hydrothermal methods may be used to make the anode active materials. Such techniques involve combining a first solution (e.g., aqueous solution) of a precursor of the metal oxide compound with a second solution (e.g., aqueous solution) of a precursor of the substituent metal under conditions (e.g., relative amounts of the precursors, elevated pressure, elevated temperature, time, in the presence of an additive) to form the metal-substituted metal oxide. Organometallic compounds may be used for the precursor compounds. Illustrative precursor compounds, conditions and additives are provided in the Example, below. The conditions noted above may be adjusted to achieve a particular ratio of metal of the metal oxide/substituent metal, the hexagonal shape, single-crystal material, and/or the random/uniform distribution of substituent metal as described above. By way of illustration, to achieve the $Cu_{3/7}Co_{18/7}O_4$ material, these parameters should generally be within 10% of the values of these parameters used in the Example, below.

The anode active materials may be used in the anode of a Li$^+$ ion battery. The Li$^+$ ion battery may further include a cathode in electrical communication with the anode; an electrolyte disposed between the anode and the cathode; and a separator also disposed between the anode and the cathode. Known materials may be used for the cathode, the electrolyte and the separator. Illustrative cathode, electrolyte and separator materials are provided in the Example, below.

The anode active materials may be further characterized by their morphologies in the lithiated/delithiated states. As noted above and further described in the Example, below, it has been found that upon lithiation of the present anode active materials, the substituent metal can form a 3D network of the substituent metal through which other nanoparticles are distributed, including nanoparticles composed of Li$_2$O and nanoparticles composed of the metal of the metal oxide compound. In this lithiated state, the substituent metal of the network may have a cube-on-cube orientation relationship with the Li$_2$O of the Li$_2$O nanoparticles even if there is a substantial lattice mismatch (e.g., greater than 20%). Upon delithiation, the anode active material comprises the 3D network of the substituent metal and nanoparticles distributed throughout the network, including nanoparticles composed of an oxide of the substituent metal and nanoparticles composed of an oxide of the metal of the metal oxide compound. In this delithiated state, the substituent metal of the network may also have a cube-on-cube orientation relationship with the oxide of the substituent metal; again, even if there is substantial lattice mismatch (e.g., greater than 20%). Thus, the 3D network of the substituent metal is maintained during lithiation/delithiation and serves as a conductive and flexible matrix which accommodates the various chemical and structural changes that accompany lithiation/delithiation. Surprisingly, this 3D network is able to form even in the presence of very small amounts of the substituent metal, e.g., at ratios of the metal of the metal oxide/substituent metal in the range of from about 5 to about 10.

The "network of substituent metal" may be composed of nanoflakes or nanoplates of the substituent metal. By "3D network" it is meant that the network of the substituent metal extends in three-dimensions throughout the anode active material, akin to veins in a body. The average thickness of such veins (i.e., assemblies of nanoflakes/nanoplates) may be in the range of from about 10 to 100 nm or from about 20 nm to about 50 nm. The average size (i.e., diameter) of the nanoparticles of the metal of the metal oxide may be in the range of from about 1 nm to about 10 nm or from about 1 nm to about 5 nm. The average size of the Li$_2$O nanoparticles and the nanoparticles of the oxide of the substituent metal may be in the range of from about 10 to 100 nm or from about 20 nm to about 50 nm. Average thicknesses/sizes may be determined from a representative number of nanocrystals using TEM images.

The morphologies of the anode active materials in the lithiated/delithiated states may be verified using TEM and HREM as described in the Example, below. By way of illustration, the morphologies of the lithiated/delithiated states of a Cu-substituted $Co_3O_4$ ($Cu_{3/7}Co_{18/7}O_4$) anode active material is illustrated in FIGS. 4D and 4E. In the lithiated state, the anode active material comprises a network of Cu metal and Li$_2$O nanoparticles and Co nanoparticles distributed throughout the network. In the delithiated state, the anode active material comprises the network of Cu metal and CuO nanoparticles and CoO nanoparticles distributed throughout the network. As shown in FIG. 4D, although some of the Cu metal is oxidized to CuO in the delithiated state, the oxidation is only partial so that the network of Cu is maintained. In the lithiated state, the Cu and Li$_2$O nanoparticles have a cube-on-cube orientation relationship. In the delithiated state, the Cu and CuO nanoparticles have a cube-on-cube orientation relationship.

EXAMPLE

Introduction

The conversion/deconversion reactions between transitional metal oxides and lithium bears similarity to that in lithium-oxygen batteries, wherein Li$_2$O (and Li$_2$O$_2$) is repeatedly formed in the discharge cycle and decomposed in the charging cycle. The conversion reaction:

$$M_xO_y + 2yLi^+ + 2ye^- \rightarrow xM_0 + yLi_2O \tag{1}$$

is thermodynamically feasible and has a positive electromotive force[10]. In discharge, however, large volume expansion due to Li$_2$O formation limits cycling stability.

The Deconversion Reaction:

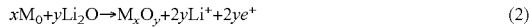

$$xM_0 + yLi_2O \rightarrow M_xO_y + 2yLi^+ + 2ye^+ \quad (2)$$

involves cleavage of stable Li—O bonds, which is not a thermodynamically favorable process (1.98 eV/atom). Thus, efficient decomposition of Li$_2$O to reduce the amount of electrochemically inactive Li$_2$O in the charging cycle and to keep lithium ions active in cycling are important challenges. In this Example, we demonstrate Cu-substituted Co$_3$O$_4$ as a stable conversion electrode material that exhibits both high capacity and cycling stability in a single materials system.

Experimental

Materials:

Hydrothermal method was used to synthesize Cu-substituted Co$_3$O$_4$ nanocrystals. In a typical synthesis, 0.02 mmol Co(acac)$_2$ and 0.02 mmol Cu(acac).2H$_2$O was dissolved in 10 ml deionized water and stirred for 1 h. Then 10 ml Co$^{2+}$ (0.02 M) aqueous solution, 10 ml Cu$^{2+}$ aqueous solution and 10 ml 0.04 M NaF aqueous solution were mixed and stirred for 1 h. The mixed suspension was transferred into a 50 ml Teflon-lined stainless steel autoclave and kept at 160° C. for 12 h. The black precipitates in the bottom were collected and washed by centrifugation for three or four times (4500 rpm, 5 min) using ethanol. The power was dried at 80° C. for 12 h for the subsequent characterization and electrochemical measurements.

Characterization:

Field emission scanning electron microscope (Hitachi, SU-8030) was used to observe the microstructure of the prepared samples. Crystal structure was identified using X-ray diffraction with Cu-Kα radiation (Scintag XDS2000). Field emission high resolution transmission electron microscope (JEOL, JEM-2100F) and a dedicated scanning transmission electron microscope (Hitachi-2300 STEM) were employed to do the characterization.

Electrochemical Measurements:

Active materials of Cu-substituted Co$_3$O$_4$ or Co$_3$O$_4$ were mixed with super-P carbon black and poly vinylidene fluoride (PVDF) at weight ratio of 70:20:10 using N-methyl-2-pyrrolidone (NMP) as solvent. The obtained slurry was then coated on tailed Cu foil and dried at 80° C. for 12 h in a vacuum oven to remove the solvent and used as the working electrodes. Half-cells were assembled in Ar-filled glove box using pure lithium metal foil as the counter electrode, and Celgard 2325 membrane as separator. The 1M LiPF$_6$ in a mixture of ethylene carbonate and dimethyl carbonate (volume ratio=1:1) was used as electrolyte.

The discharge and charge measurements of the half-cells were performed on a multi-channel battery testing system Arbin BT-2143 between the volt range from 0.01 to 3V (vs. Li/Li$^+$) at room temperature. The rate performance of Cu-substituted Co$_3$O$_4$ and Co$_3$O$_4$ are also evaluated at different current densities from 0.1 to 1.0 A/g.

In-Situ TEM:

Like other window-less in-situ TEM settings[8] the open half-cell was constructed in an in-situ electrical probing TEM holder (Nanofactory Instrument). This holder has a dual-probe design, i.e. one Au rod is used as the sample holder with a small amount of Cu-substituted Co$_3$O$_4$ attached to its tip; on the other side a STM tungsten (W) probe driven by Piezo-motor capable of 3D positioning with a step-size of 1 nm was used to mount Li metal. The W probe tip was scratched by Li metal strip and then affixed on the TEM holder inside an Ar-filled glove box. With an airtight cover, the TEM holder was transferred to TEM column with limited exposure to air (5 s), where a layer of lithium oxide was grown on the surface of Li metal and acted as a solid electrolyte for the nano-cell Li-ion batteries.

First-Principle Calculations:

All the first-principle calculations were conducted via the Vienna Ab-initio Simulation Package (VASP)[16] with the projector augmented wave (PAW) potentials.[17] For the exchange-correlation functional, we used the generalized gradient approximation (GGA) of Perdew-Becke-Emzerhof (PBE)[18] with spin polarization considered. We used two different sets of parameters: one for lower energy configuration sampling and the other for accurate total energy determination of these lower energy configurations determined. For the coarse energy sampling calculations, a plane-wave basis set with a cutoff energy of 300 eV and Γ-centered k-meshes with the density of 2000 k-points per reciprocal atom were used. The accurate total energy calculations were performed with a plane-wave basis set cutoff energy of 520 eV and Γ-centered k-meshes with the density of 8000 k-points per reciprocal atom. DFT+U method[19] was used to treat the 3d electrons of Co and Cu ions with U values of 3.3 eV and 4.0 eV adopted following previous studies.[19-20]

Search for the Non-Equilibrium Intermediate Phases Through the Li Cu-Substituted Co$_3$O$_4$ and CuO Reactions:

We used a non-equilibrium phase search (NEPS) method to identify the intermediate phases during the non-equilibrium lithiation process of Cu-substituted Co$_3$O$_4$ and CuO by exploring geometrically distinct Li/vacancy configurations on possible insertions sites of Cu-substituted Co$_3$O$_4$ and CuO structures at different compositions (Li/vacancy ratios). (See G. L. Hart, R. W. Forcade, *Phys. Rev. B* 2008, 77, 224115; Q. Li, Z. Yao, J. Wu, S. Mitra, S. Hao, T. S. Sahu, Y. Li, C. Wolverton, V. P. Dravid, *Nano Energy* 2017, 38, 342.) The searching is initiated by identifying all the unoccupied sites of Cu-substituted Co$_3$O$_4$ and CuO.

For Cu-substituted Co$_3$O$_4$, we used a supercell containing 1 Cu$^{2+}$ cations and 5 Co$^{3+}$ cations and 8 O$^{2-}$ anions, which has 18 (14 tetrahedral and 4 octahedral) unoccupied sites in total for Li uptake. The primitive spinel unit cell of Co$_3$O$_4$ contains 6 Co and 8 O atoms, and replacing one Co with a Cu ion results in a 1:5 ratio of Cu:Co, a reasonable approximation to the observed composition. Creating a supercell with a 1:6 ratio would require a multiple of 7 cations, resulting in a supercell that is 7 times larger than the primitive cell, which would be computationally prohibitive for the extensive lithiation simulations. The use of a 1:5 ratio in the DFT calculations is then simple for computational efficiency. We insert the Li atoms into the unoccupied sites for a range of compositions within 0<x≤8 for Li$_x$Cu$_{0.5}$Co$_{2.5}$O$_4$. For CuO, we used a supercell containing 6 Cu$^{2+}$ cations and 6 O$^{2-}$ anions, which has 12 octahedral unoccupied sites for Li uptake. Starting from an initial structure (not shown), we insert the Li atoms into the unoccupied sites for a range of compositions within 0<x≤2 for Li$_x$CuO. Enum code was used to generate all symmetrically distinct configurations of Li on the unoccupied sites for each composition of Li$_x$Cu$_{0.5}$Co$_{2.5}$O$_4$ and Li$_x$CuO. Total energies of all these configurations were firstly sampled using coarse DFT calculations with parameters described herein. (See G. L. Hart, R. W. Forcade, *Phys. Rev. B* 2008, 77, 224115; G. L. Hart, R. W. Forcade, *Phys. Rev. B* 2009, 80, 014120; G. L. Hart, L. J. Nelson, R. W. Forcade, *Comput. Mater. Sci.* 2012, 59, 101; G. L. Hart, R. W. Forcade, *Phys. Rev. B* 2009, 80, 014120; G. L. Hart, L. J.

Nelson, R. W. Forcade, *Comput. Mater. Sci.* 2012, 59, 101; M. Aydinol, A. Kohan, G. Ceder, K. Cho, J. Joannopoulos, *Phys. Rev. B* 1997, 56, 1354; M. K. Chan, C. Wolverton, J. P. Greeley, *J. Am. Chem. Soc.* 2012, 134, 14362; C. Wolverton, A. Zunger, *Phys. Rev. Lett.* 1998, 81, 606; E. Sanville, S. D. Kenny, R. Smith, G. Henkelman, *J. Comput. Chem.* 2007, 28, 899; and W. Tang, E. Sanville, G. Henkelman, *J. Phys. Condens. Matter.* 2009, 21, 084204.) Afterward, the structures at each composition were ranked by their coarse total energies and the lowest three energy configurations are further relaxed in DFT with accurate settings described herein. We evaluated formation energies of these selected structures according to the reaction: $Cu_{0.5}Co_{2.5}O_4 + xLi^+ \rightarrow Li_xCu_{0.5}Co_{2.5}O_4$ and $CuO + xLi^+ \rightarrow Li_xCuO$. Convex hulls were then built with formation energies of all various stoichiometries. All the intermediate non-equilibrium phases were then identified by the compositions on the convex hull.

The (de)lithiation reaction voltage relative to Li/Li+ is given by the negative of the reaction free energy per Li, which is $$V = \frac{\Delta G_f}{F \Delta N_{Li}} \quad (1a)$$

where $\Delta G_f$ is the free energy molar change during the reaction, F is the Faraday constant, $\Delta N_{Li}$ is the amount of Li added/removed. (See M. Aydinol, A. Kohan, G. Ceder, K. Cho, J. Joannopoulos, *Phys. Rev. B* 1997, 56, 1354.) The enthalpic ($pV_m$) contribution to G is of the order 10 μeV per Li at atmospheric pressure and can be safely ignored and the entropic contribution to the voltage can be estimated to be systematic. (See M. K. Chan, C. Wolverton, J. P. Greeley, *J. Am. Chem. Soc.* 2012, 134, 14362.) We replace G with total energy E from DFT calculations in following calculations.

$$\Delta E = E(Li_y Cu_{0.5} Co_{2.5} O_4) - E(Li_x Cu_{0.5} Co_{2.5} O_4) - (y-x)E(Li_{metal}) \quad (2a)$$

$$\Delta E = E(Li_y CuO) - E(Li_x CuO) - (y-x)E(Li_{metal}) \quad (3a)$$

Additionally, the realistic lithiation/delithiation reactions do not necessarily proceed strictly through two-phase reactions. Thus, the voltage profiles obtained should be viewed as approximate and very small voltage steps should not be taken as significant. Meanwhile, the voltage drops in the voltage profile would become much more rounded at finite temperatures (i.e. room temperature) when take entropy contribution into account. (See C. Wolverton, A. Zunger, *Phys. Rev. Lett.* 1998, 81, 606.) Furthermore, the structures of several intermediate phases $Li_xCu_{0.5}Co_{2.5}O_4$ and $Li_xCuO$ could be disordered at finite temperature, which would also affect the energies of these phases and thus influence the voltage plateaus.

Predictions of the Non-Equilibrium Lithiation Process of Cu-Substituted $Co_3O_4$ and CuO.

We investigate the non-equilibrium lithiation process of Cu-substituted $Co_3O_4$/CuO by the prediction of non-equilibrium structures along the lithiation pathway based on geometrical numerations. Four/four non-equilibrium phases ($Li_xCu_{0.5}Co_{2.5}O_4$, x=1.0, 2.5, 5.0, 8.0 and $Li_xCuO$, x=0.67, 1.17, 1.83, 2.00) are identified constituting the Li—$Cu_{0.5}Co_{2.5}O_4$/CuO convex hull during the lithiation process of Cu-substituted $Co_3O_4$ and CuO. Using a series of lithiation reactions with these non-equilibrium phases considered, we offer the calculated non-equilibrium lithiation voltage profiles. To confirm the sequential order of reduction, Bader charge analysis were conducted for Co and Cu ions in metastable phases. (See E. Sanville, S. D. Kenny, R. Smith, G. Henkelman, *J. Comput. Chem.* 2007, 28, 899; and W. Tang, E. Sanville, G. Henkelman, *J. Phys. Condens. Matter.* 2009, 21, 084204.)

The lithiation of Cu-substituted $Co_3O_4$ initiates by Li taking the octahedral sites (x=1.0) neighbored by Cu ions and $Co^{3+}$ ions partially get reduced to $Co^{2+}$ when Bader charge of Cu decreases from to +1.27e to +1.23e. With further lithiation (x=2.5 and 5.0), the amount of Li inserted exceeds what the octahedral can accommodate and the Li ions energetically prefer the tetrahedral sites. Cu and Co ions experience reduction $Co^{3+} \rightarrow Co^{2+} \rightarrow Co^0$, $Cu^{2+} \rightarrow Cu^{1+}$ with Cu ions get partially reduced to their metal states. Meanwhile, the oxygen fcc framework only gets distorted slightly and the lithiation shows features of intercalation-type with overall preserved oxygen backbones. Beyond the intercalation-type reaction range (x≥5.0), both Cu and Co ions get partially reduced to their metal states and extruded. The lithiation now switches to the conversion-type reaction with features of phase separation. When the Cu-substituted $Co_3O_4$ is fully lithiated (x=8), Cu and Co ions have been fully reduced to Cu/Co metal and Li ions combine with O ions forming $Li_2O$.

The lithiation of CuO also initiates (x=0.67) with the intercalation-type reaction with Li ions take the empty octahedral sites. With more Li ions inserted (x=1.17), $Cu^{2+}$ ions are generally reduced to $Cu^{1+}$ while oxygen backbones maintained yet Cu and Li sublattice largely distorted. Beyond intercalation-type lithiation (x≥1.83), Cu ions start to be reduced to their metal states and extruded with the onset of phase separation. When CuO is fully lithiated, the system features with layered $Li_2O$ and Cu clusters.

Results and Discussion

Figure 1D:
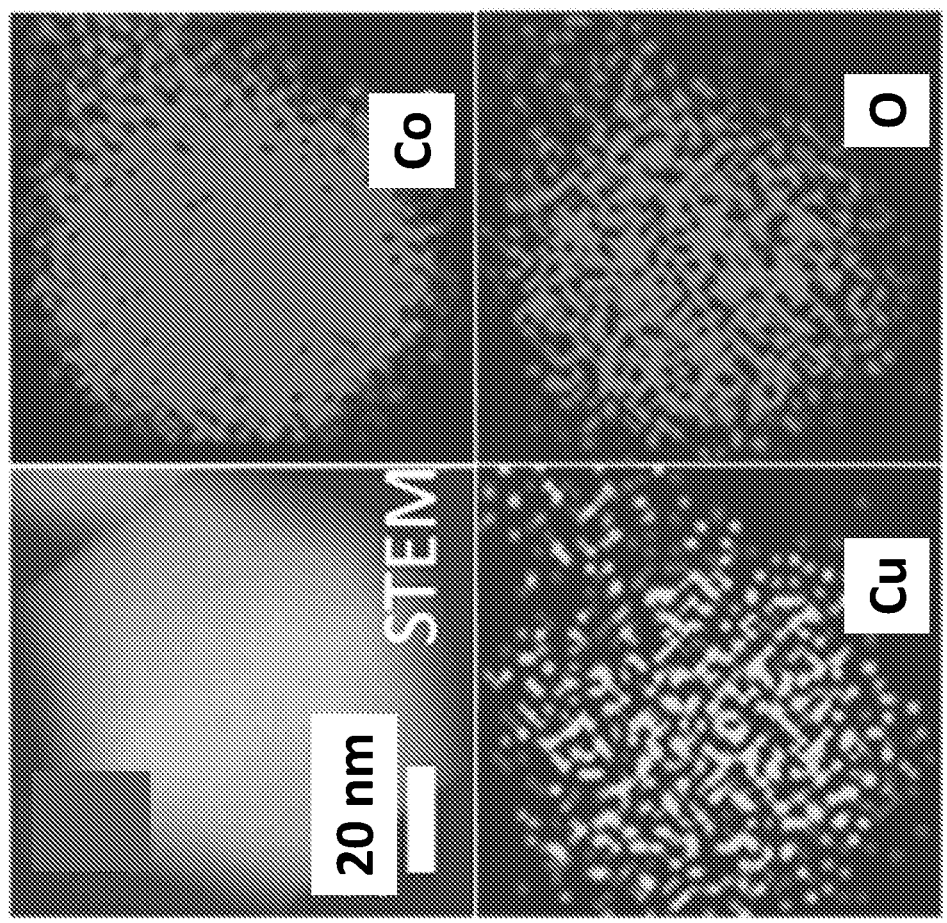

Cu-substituted $Co_3O_4$ was synthesized hydrothermally, resulting in crystals as revealed by SEM (FIG. 1A). The crystal structure was identified to be spinel (space group: Fd-3m, No. 227), the same as $Co_3O_4$, confirmed by both x-ray and electron diffraction (FIGS. 1B-1C). The elemental maps collected by x-ray energy dispersive spectroscopy (EDS) are shown in FIG. 1D. The cation ratios (Cu and Co) were varied from one sample to the other around 1:6 (as listed in Table 1, below). The phase analyses corroborate with the nominal spinel structure of $Co_3O_4$, but with a shift to low angles, indicating that copper was distributed randomly and uniformly as a solid solution. The averaged lattice parameter was identified by x-ray diffraction (FIG. 1B) as a=8.5 Å.

TABLE 1

Co/Cu atomic ratio measured by EDS from 9 pristine Cu-substituted $Co_3O_4$ nanoparticles.

| Number of the Cu-substituted $Co_3O_4$ nanoparticle | Co atom % | Cu atom % | Co/Cu ratio |
|---|---|---|---|
| 1 | 86.8 ± 0.3 | 13.1 ± 0.2 | 6.6 |
| 2 | 86.4 ± 0.3 | 13.6 ± 0.2 | 6.3 |
| 3 | 86.2 ± 0.4 | 13.8 ± 0.2 | 6.2 |
| 4 | 85.6 ± 0.3 | 14.4 ± 0.2 | 5.9 |
| 5 | 86.3 ± 0.3 | 13.7 ± 0.2 | 6.3 |
| 6 | 85.7 ± 0.3 | 14.3 ± 0.2 | 5.9 |
| 7 | 86.5 ± 0.3 | 13.5 ± 0.2 | 6.4 |
| 8 | 85.2 ± 0.3 | 14.8 ± 0.2 | 5.7 |
| 9 | 86.4 ± 0.5 | 13.5 ± 0.4 | 6.4 |

Figure 1F:
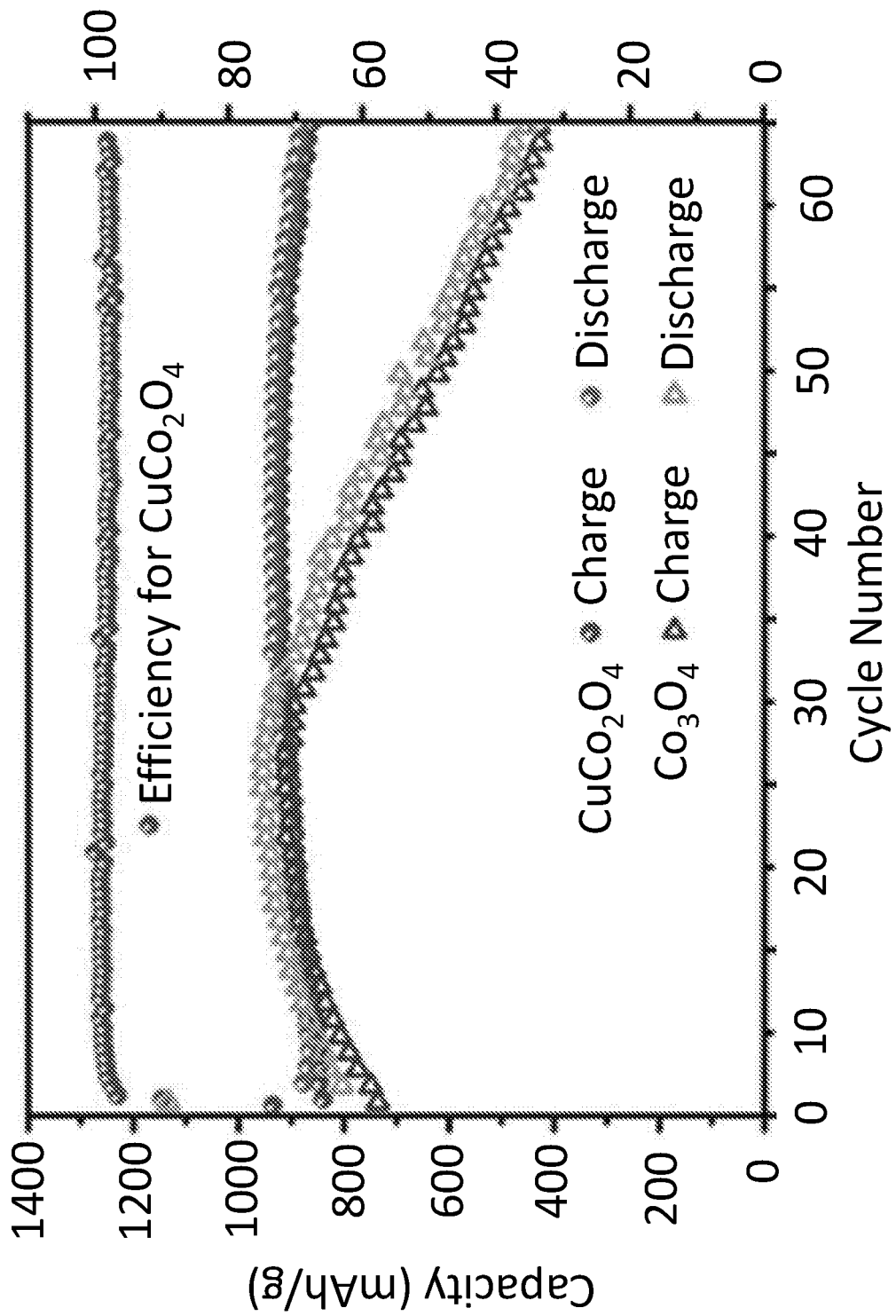

The cycling stability of the Cu-substituted $Co_3O_4$ was greatly improved as shown by the electrochemical measurements. Coin-cell batteries using as-prepared Cu-substituted $Co_3O_4$ and pure $Co_3O_4$ as electrodes were fabricated and evaluated for their lithium storage properties in the potential window of 0.01-3.0 V (vs Li/Li$^+$) (FIG. 1F). Cu-substituted $Co_3O_4$ showed a high second discharge capacity of 877 mAh g$^{-1}$ at a current density of 0.1 A g$^{-1}$. After 60 cycles of charging and discharging, high capacity was retained at ~863 and ~883 mAh g$^{-1}$, respectively. In contrast, pure bulk $Co_3O_4$ showed a greatly reduced capacity (<200 mAhg$^{-1}$) after just 20~30 cycles.[11] Nanosizing is an effect approach to improve the cyclability. We have measured the electrochemical properties of pure $Co_3O_4$ nanoparticles that are ~50 nm in size (FIG. 1F), which showed discharge capacity of 796 mAh g$^{-1}$ at the second cycle. After 60 cycles at the same current density, it exhibited notably fast capacity decay, with charge and discharge capacity of 423 and 445 mAh g$^{-1}$, respectively. Evidently, the pure $Co_3O_4$ control sample exhibits significantly inferior cycling stability compared to Cu-substituted $Co_3O_4$. In addition, Cu-substituted $Co_3O_4$ shows improved charge/discharge kinetics compared to $Co_3O_4$. The capacity of Cu-substituted $Co_3O_4$ compared to $Co_3O_4$ control samples at various cycling rates ranging from 0.1 to 1.0 A g$^{-1}$ was also measured (0.125 to 1.25 C; A C-rate is a measure of the rate at which a battery is discharged relative to its maximum capacity; for example, 1 C rate means that the discharge current will discharge the entire battery in 1 hour) (data not shown). Over this range, the capacity of the Cu-substituted $Co_3O_4$ electrode exceeded 400 mAh g$^{-1}$, whereas for the control it dropped below 100 mAh g$^{-1}$ at the highest cycling rate.

To probe the physical mechanism underlying the improved electrochemical performance of Cu-substituted $Co_3O_4$, the lithiation of Cu-substituted $Co_3O_4$ was directly investigated by in-situ TEM with a pre-assembled half-cell miniature battery configuration. A representative pristine, single-crystalline Cu-substituted $Co_3O_4$ nanoparticle (see FIG. 2A) oriented close to the [110] axis was chosen for examination during lithiation. The lithiation of this nanoparticle resulted in the formation of nanoscale crystallites (FIG. 2B) with overall areal expansion of about 200% (data not shown), showing large volume expansion. In the selected-area electron diffraction (SAED) pattern, shown as an inset in FIG. 2B, diffraction rings of $Li_2O$ and broader diffuse scattering were observed, indicating that reaction product is a mixture of $Li_2O$, Cu and Co nanocrystals.

The orientation relationship between the formed Cu and $Li_2O$ was further disclosed by nano-beam electron diffraction. Several bright diffraction spot arcs were observed along the diffuse rings, close to bright spots of $Li_2O$, as indicated by the arrowheads in the inset of FIG. 2B. In the nano-beam electron diffraction pattern obtained (not shown), alignment of the diffraction spots was evident. These spots represent the Cu {111} and $Li_2O$ {111} planes, while both crystals are oriented along the [110] direction. In the pattern, the Cu_(-11-1) spot and $Li_2O$_(-11-1) spot were not superimposed due to large mismatch (~22%). However, the two spots are in the same radial line without any rotational mismatch. Such an intimate relationship was also observed for other diffraction spots, which demonstrates a cube-on-cube orientation relationship although the interface between Cu and $Li_2O$ is incoherent. Both Cu and $Li_2O$ showed strong single-crystalline sharp spots, indicating that the crystalline size of Cu and $Li_2O$ crystals was sufficiently large, in the range ~20 nm (the beam size used for nano-beam diffraction was ~50 nm) or larger. Meanwhile, the size of the Co clusters was very small, ~2 nm, as measured from the high-resolution electron microscopy (HREM) images. In addition, the Co clusters were likely defective and highly strained (data not shown) as indicated by the broad diffuse arcs in the nano-beam diffraction pattern (data not shown). Moreover, the Co clusters appeared as bright regions in the Z-contrast scanning transmission electron microscopy (STEM) image (data not shown). Combined with electron energy loss spectroscopy (EELS) of O and Co, the Co and O distribution was spatially revealed (data not shown), confirming that the bright clusters in the STEM image were rich in Co.

At the end of the first lithiation, there were ~2 nm Co clusters distributed on the ~20 nm metal Cu and $Li_2O$ crystals, with the Cu and $Li_2O$ crystals exhibiting a cube-on-cube orientation relationship ([100]//[100] and (100)//(100)) (data not shown). We also investigated the cycled Cu-substituted $Co_3O_4$ that was taken out from the coin cells after running at different cycles. The ex-situ results obtained at the first and 10$^{th}$ cycle by ex-situ observation (data not shown) agreed well with the in-situ TEM observations. In short, very fine Co-metal nanoclusters uniformly distributed on Cu and $Li_2O$ crystals were formed at the end of the first lithiation, while Cu and $Li_2O$ have the cube-on-cube orientation relationship although their lattice mismatch is large.

The Cu-substituted $Co_3O_4$ lithiation was further investigated at high resolution and in conjunction with DFT simulations, to understand why $Li_2O$ and Cu crystals have such an intimate and low-index cube-on-cube orientation relationship despite a large lattice mismatch. As shown in FIGS. 3A-3D, the lithiation propagates with the motion of the interface delineating the lithiated and pristine phases. A closer observation of the interface (data not shown) revealed the formation of Li intercalated and crystalline phases with a notably expanded {022} lattice spacing, from 0.28±0.1 nm of the $Cu_{3/7}Co_{18/7}O_4$ to 0.30±0.1 nm and 0.32±0.1 nm. However, further lithiation leads to phase separation, resulting in the formation of $Li_2O$ and Cu crystals as evidenced by the splitting of spots in the Fourier transformation (data not shown). The Co atoms are extruded from the nanostructures forming Co-clusters with the Co-clusters growing larger as more lithium is inserted (data not shown). Instead of forming large ~20 nm Cu crystals, Co atoms tend to form small clusters ~2 nm when they are extruded.

The lithiation of Cu-substituted $Co_3O_4$ was simulated using DFT based non-equilibrium phase searching method,[13] which shows the prediction of several intermediate and metastable phases. For the simplicity of super-cell generation in DFT calculations and computational efficiency, the Cu/Co ratio was taken as 1:5 for the original phase before lithiation. From the {220} spacing (referring to the spinel lattice), three intermediate phases predicted by DFT calculations were observed (not shown), prior to the final phase separation by the conversion reaction (not shown). Instead of direct transition from Cu-substituted $Co_3O_4$ to metal Cu, Co and $Li_2O$, the intermediate and Li-intercalated $Li_xCu_{3/7}Co_{18/7}O_4$ phases provide a gradual transformation pathway to the formation of nanoscale $Li_2O$ and Cu, allowing them to have a close orientation relationship. This explains the experimentally observed orientation between these phases, even though they have large lattice mismatch. The reactions involved in Cu-substituted $Co_3O_4$ lithiation calculated by DFT are summarized in Table 2, below.

TABLE 2

DFT predicted non-equilibrium lithiation and equilibrium delithiation reaction pathways of Cu-substituted Co$_3$O$_4$ during the 1$^{st}$ discharge and charge.

| | Capacity (mAh/g) | Voltage (V) |
|---|---|---|
| Cu$_{0.5}$Co$_{2.5}$O$_4$ + 1.0 Li → Li$_{1.0}$Cu$_{0.5}$Co$_{2.5}$O$_4$ + | 110 | 2.16 |
| 2.5 Li → Li$_{2.5}$Cu$_{0.5}$Co$_{2.5}$O$_4$ + | 276 | 1.41 |
| 5.0 Li → Li$_{5.0}$Cu$_{0.5}$Co$_{2.5}$O$_4$ + | 551 | 1.10 |
| 8.0 Li → Li$_{8.0}$Cu$_{0.5}$Co$_{2.5}$O$_4$ (4Li$_2$O + 2Co + Cu) → | 882 | 0.50 |
| Cu + 2 Co + 11/3 Li$_2$O → Cu + 2 CoO + 5/3 | 446 | 1.90 |
| Li$_2$O + 4 Li → LiCuO + 2 CoO + 2/3 Li$_2$O + | 632 | 2.10 |
| 6 Li → CuO + 2/3 Co$_3$O$_4$ | 818 | 3.00 |

Figures 4A, 4B:
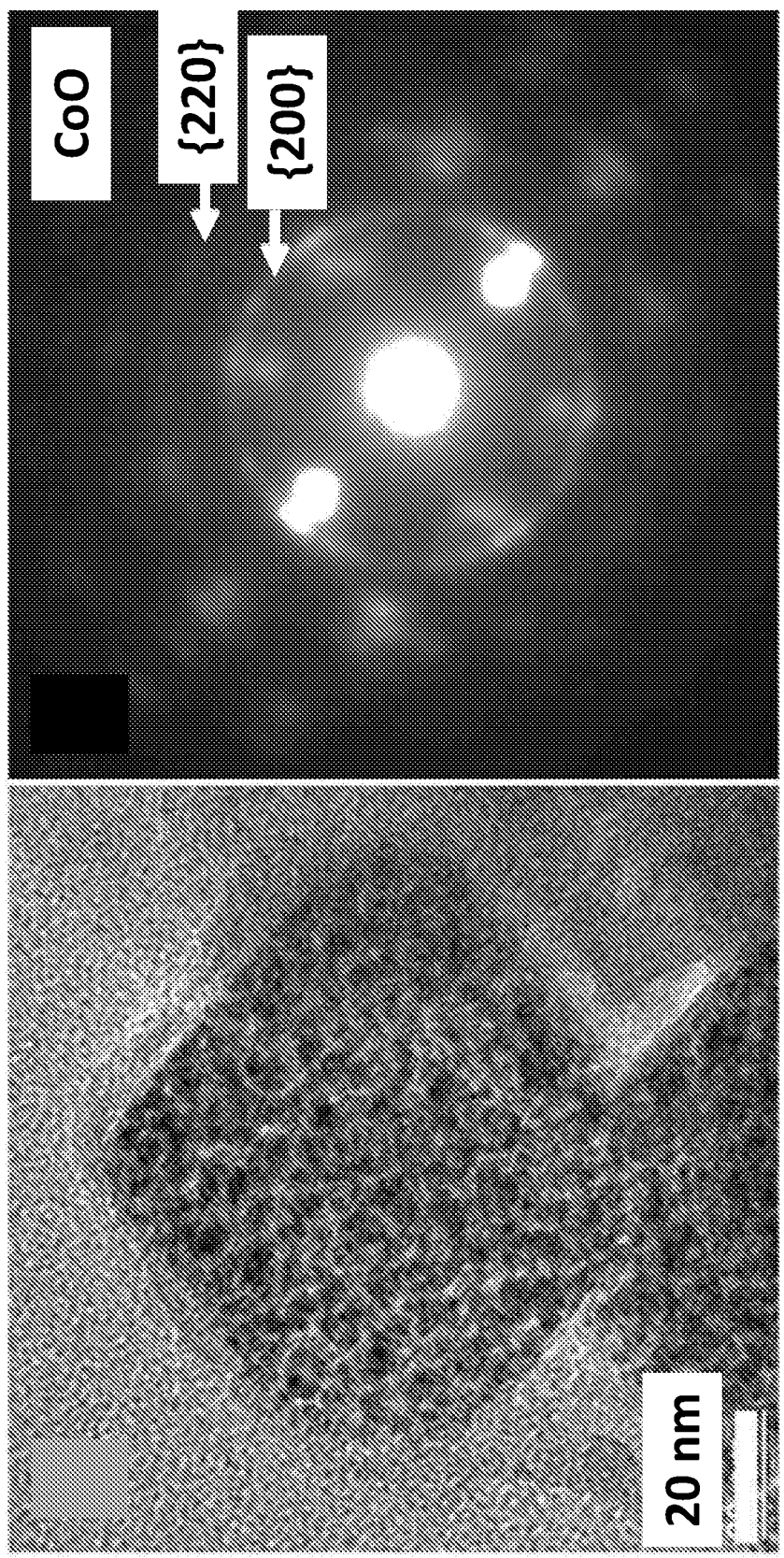
FIGS. 4A-4E illustrate the structural evolution during Cu-substituted $Co_3O_4$ delithiation.
Figure 4C:
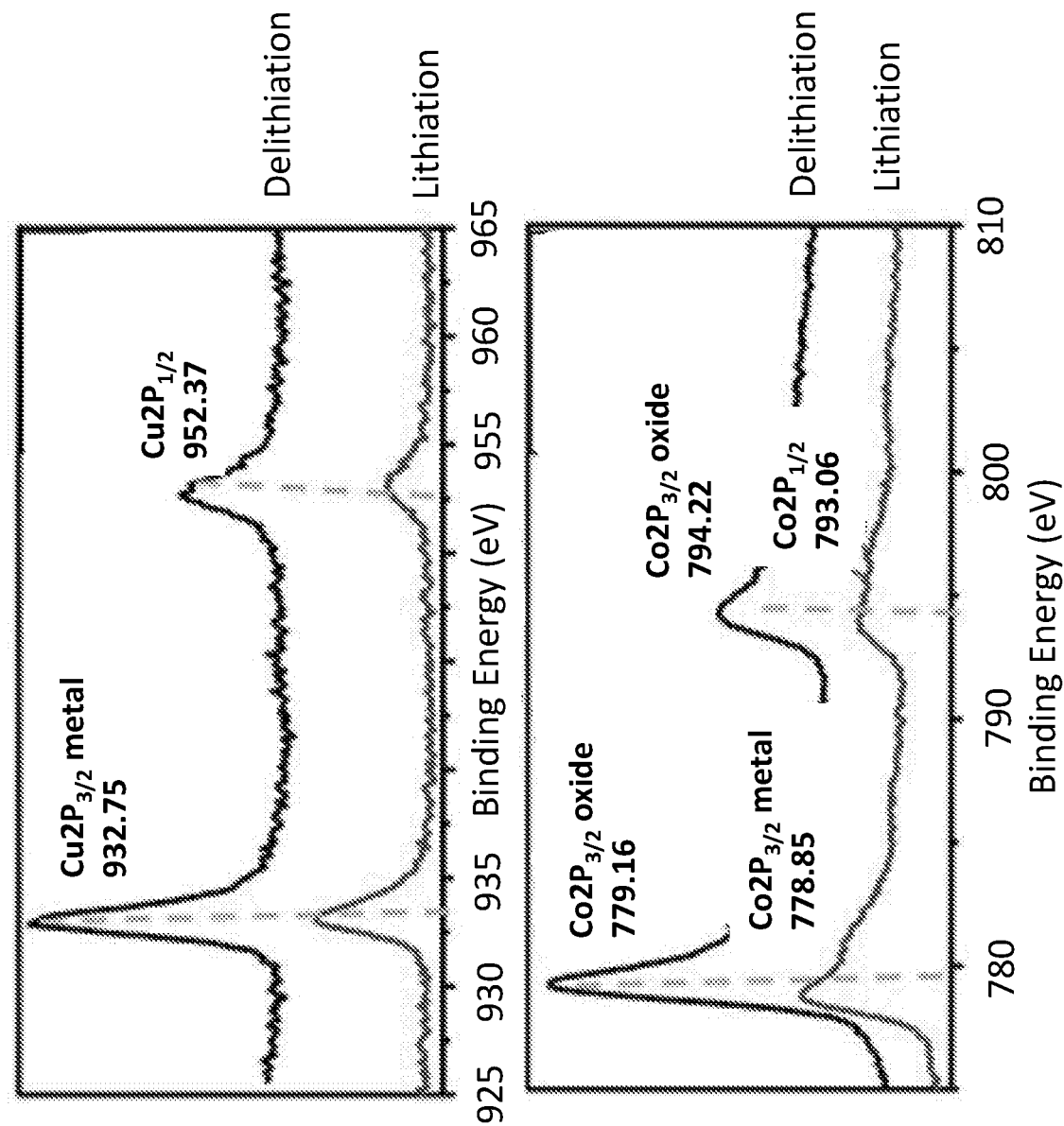
Figures 4D, 4E:
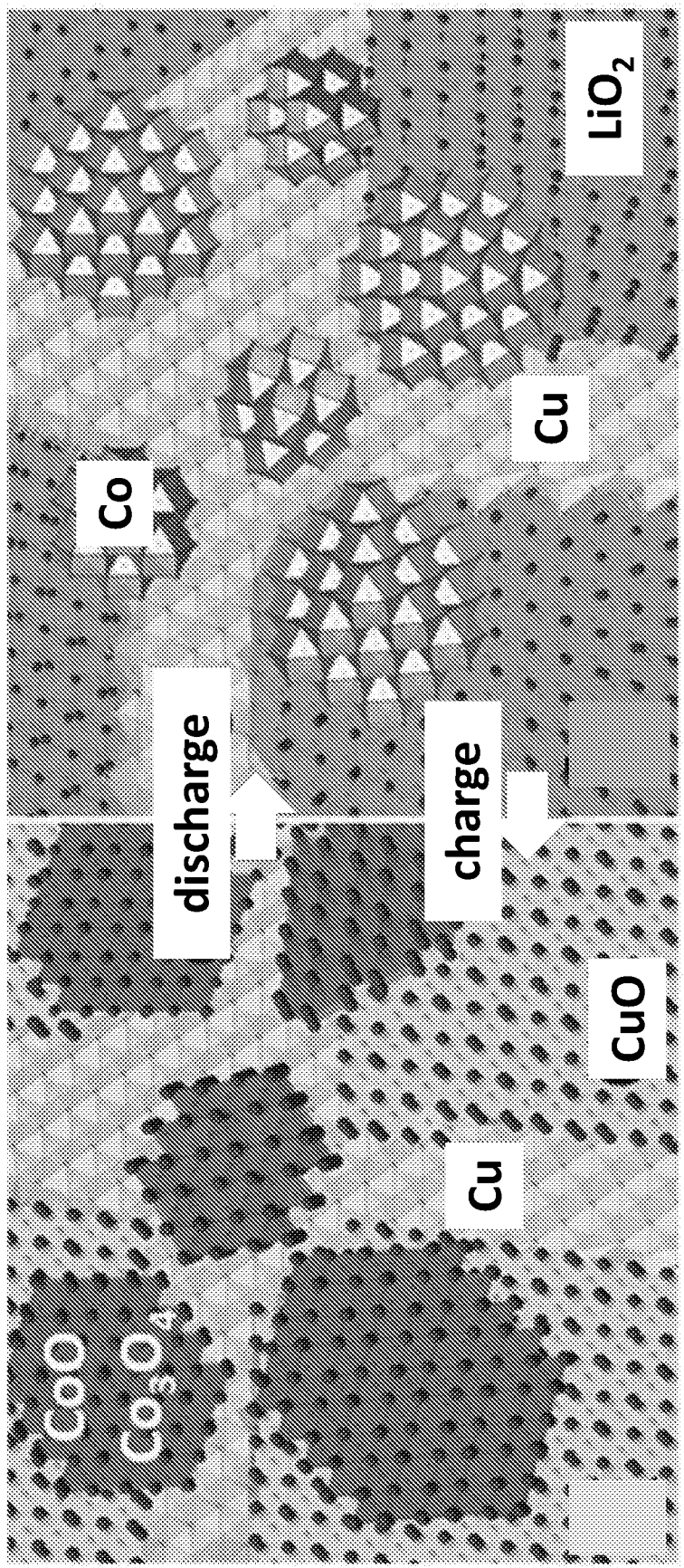

In the charging cycle (delithiation), the particles being charged maintain their shape and continue to have a polycrystalline structure as shown in FIG. 4A. An unusual intimate orientation relationship between the formed CuO crystals and Cu has been disclosed while Cu is oxidized into CuO. In the SAED pattern of the delithiated sample (FIG. 4B), several diffraction rings can be identified as CoO nanocrystals. The bright diffraction spots from larger crystals can be indexed as metal Cu and CuO (data not shown). After delithiation, there are ~2 nm CoO clusters on the metal Cu and CuO crystals of ~20 nm (data not shown), while Cu and the newly formed CuO crystals have a cubic-to-cubic orientation relationship (if one considers CuO as the pseudocubic lattice). The chemical state of both Cu and Co were identified by XPS (FIG. 4C), showing the oxidation of Co and partial oxidation of Cu during delithiation. Along with the decomposition of Li$_2$O, delithiation results in the Co nanoparticles being oxidized to CoO (and perhaps even Cu$_x$Co$_{3-x}$O$_4$). However, only some portion of the Cu metal are oxidized to CuO, as there are still clear metallic FCC Cu peaks in the electron diffraction. By simply assuming kinematic scattering and using the intensities of the Cu(111) and CuO(110) spots, the CuO/Cu atomic ratio was estimated to be about 4.7/1, which means in the delithiation about 20% of the Cu remains as support. The reactions during delithiation are summarized in Table 2, above. CuO has higher voltages (~2.1 V) than that of CoO (~1.7 V), meaning that metal Co will be oxidized first while Cu is still in the metallic form. Although it is not observed in the diffraction patterns, the presence of Co$_3$O$_4$ cannot be excluded since the voltage reaches more than 2.5 V[14].

The lithiation and delithiation reactions in the first cycle can be described as:

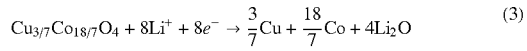

$$Cu_{3/7}Co_{18/7}O_4 + 8Li^+ + 8e^- \rightarrow \frac{3}{7}Cu + \frac{18}{7}Co + 4Li_2O \quad (3)$$

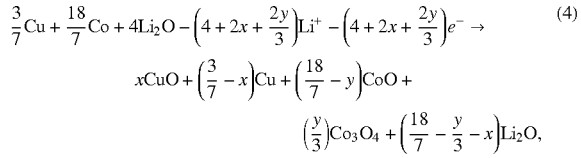

$$\frac{3}{7}Cu + \frac{18}{7}Co + 4Li_2O - \left(4 + 2x + \frac{2y}{3}\right)Li^+ - \left(4 + 2x + \frac{2y}{3}\right)e^- \rightarrow$$
$$xCuO + \left(\frac{3}{7} - x\right)Cu + \left(\frac{18}{7} - y\right)CoO +$$
$$\left(\frac{y}{3}\right)Co_3O_4 + \left(\frac{18}{7} - \frac{y}{3} - x\right)Li_2O, \quad (4)$$

where x is ratio of CuO/Cu to measure how much Cu has been oxidized and y is ratio of Co$_3$O$_4$/CoO to measure how much Co$^0$ has been oxidized to Co$^{3+}$.

Part of the Li$_2$O formed in the first lithiation becomes inactive in the following cycles depending on how much Cu has been oxidized, which may partially contribute to the large capacity loss in the first cycle (besides the formation of SEI). In the subsequent cycles, although the Cu/CuO redox reaction tends to become more stable, the fluctuation of the amount of Cu being oxidized may eventually influence the actual capacity. This effect may explain why sometimes there is an increase in capacity, as is commonly observed in oxide electrodes.

The nanocomposites of small CoO nanoparticles uniformly distributed on a thin and stretchable metal Cu/CuO network appear robust for long duration cycling. In lithiation, Cu/CuO nanoplates and Cu/CoO interfaces provide enough sites for Li$_2$O nucleation and growth (illustrated in FIG. 4D), which enables volumetric expansion without fracture. In delithiation, the intimate contact of Cu nanoplates and Co nanoparticles may act as a catalyst for the Li$_2$O decomposition reaction (illustrated in FIG. 4E). In addition, the metal Cu nanoplates form a percolating network, enabling high electronic conductivity (data not shown). The two major products in lithiation, Cu (fcc with a=3.615 Å) and Li$_2$O (fcc with a=4.619 Å), have a simple cube-on-cube relationship, although their misfit is about 22%. In delithiation, Cu and CuO (pseudocubic structure with a=4.778 Å) have also a cube-on-cube relationship although their misfit is about 24%. The cube-on-cube relationship helps not only maintain the intimate contact between Li$_2$O and Cu in lithiation, and between CuO and Cu in delithiation, but also provide an efficient way of accommodating the Li$_2$O in lithiation and CuO in delithiation. Such an electrochemically driven confinement at nano-scale prompts the reversibility of the lithiation/delithiation reactions and thus the cycling stability. Among all the advantages brought by Cu substitution, the formation of Cu support is the most salient one. In pure Co$_3$O$_4$ without Cu substitution, Co nanoparticles formed in lithiation are on the nonconductive Li$_2$O support and may pulverize and be lost in the following cycles when Li$_2$O decomposes in delithiation. In Cu-substituted Co$_3$O$_4$, large size Cu formed in lithiation serves as a high conductivity backbone and cohesive support to accommodate Co nanoclusters thus preventing active materials from losing mechanical integrity or electrical contact to the current collector. Meanwhile, the size of Co (in lithiation) and CoO (in delithiation) remains small due to the existence of the Cu which is immiscible with Co.

The lithiation reactions show an initial intercalation of lithium, prior to the conversion reaction.[15] The intermediate phases formed during the non-equilibrium intercalation are not observed in delithiation and are likely not part of the ground-state equilibrium reactions. To explore the interplay among non-equilibrium, intercalation, and conversion reactions, we have developed a computational non-equilibrium phase search method to identify intermediate phases (data not shown). The calculated voltage profiles (data not shown) based on the lithiation/delithiation reactions (listed in Table 2) fit well to the experimental curves. The lithiation and delithiation processes proceed through non-equilibrium and equilibrium reaction paths, respectively. Such a difference in reaction path have a contribution to the experimentally-observed voltage hysteresis.

CONCLUSION

In conclusion, the substitution of a third metallic element (Cu) into binary oxides (Co$_3$O$_4$) alters the fundamental processes of lithiation/delithiation. Metal Cu intrinsically formed in the first lithiation cycle remains partially stable as a metallic support on which Li$_2$O+Co/CoO redox products are anchored. The Cu-based network also provides a highly conductive pathway for electrons and enables Li-ion transport. Cu and Co are immiscible which prevents the aggregation of metal clusters, leaving enough space for $Li_2O$ nucleation and growth. In addition, an unusual intimate orientation relationship between the Cu crystals and $Li_2O$ crystal has been identified, and small Co/CoO clusters are found to remain active on the $Cu/CuO/Li_2O$ substrate in subsequent cycles. This "adaptive architecture" accommodates the formation of $Li_2O$ in the discharge cycle and underpins the catalytic activity of $Li_2O$ decomposition in the charging cycle. These ternary oxides may be extended and applied to other electrochemical storage technologies, such as $Li-Li_2O/Li_{2O2}$ batteries.

REFERENCES

[1] E. Peled, C. Menachem, D. Bar-Tow, A. Melman, J. Electrochem. Soc. 1996, 143, L4.
[2] K.-S. Chen, R. Xu, N. S. Luu, E. B. Secor, K. Hamamoto, Q. Li, S. Kim, V. K. Sangwan, I. Balla, L. M. Guiney, Nano Lett. 2017, 17, 2539.
[3] K. Mizushima, P. Jones, P. Wiseman, J. B. Goodenough, Mater. Res. Bull. 1980, 15, 783.
[4] a) P. Poizot, S. Laruelle, S. Grugeon, L. Dupont, J. Tarascon, Nature 2000, 407, 496; b) P.-L. Taberna, S. Mitra, P. Poizot, P. Simon, J.-M. Tarascon, Nat. Mater. 2006, 5, 567.
[5] a) B. Boukamp, G. Lesh, R. Huggins, J. Electrochem. Soc. 1981, 128, 725; b) M. Obrovac, L. Christensen, Electrochem. Solid-State Lett. 2004, 7, A93; c) H. Wu, Y Cui, Nano Today 2012, 7, 414.
[6] H. Wang, Y Yang, Y Liang, J. T. Robinson, Y Li, A. Jackson, Y Cui, H. Dai, Nano Lett. 2011, 11, 2644.
[7] a) Q. Li, H. Liu, Z. Yao, J. Cheng, T. Li, Y Li, C. Wolverton, J. Wu, V. P. Dravid, ACS Nano 2016, 10, 8788; b) A. Abouimrane, D. Dambournet, K. W. Chapman, P. J. Chupas, W. Weng, K. Amine, J. Am. Chem. Soc. 2012, 134, 4505; c) Y Cui, A. Abouimrane, J. Lu, T. Bolin, Y Ren, W. Weng, C. Sun, V. A. Maroni, S. M. Heald, K. Amine, J. Am. Chem. Soc. 2013, 135, 8047.
[8] a) M. T. McDowell, S. W. Lee, J. T. Harris, B. A. Korgel, C. Wang, W. D. Nix, Y Cui, Nano Lett. 2013, 13, 758; b) Q. Li, J. Wu, J. Xu, V. P. Dravid, J. Mater. Chem. A 2016, 4, 8669; c) J. Y Huang, L. Zhong, C. M. Wang, J. P. Sullivan, W. Xu, L. Q. Zhang, S. X. Mao, N. S. Hudak, X. H. Liu, A. Subramanian, Science 2010, 330, 1515; d) X. H. Liu, J. Y Huang, Energy Environ. Sci. 2011, 4, 3844; e) X. H. Liu, J. W. Wang, S. Huang, F. Fan, X. Huang, Y Liu, S. Krylyuk, J. Yoo, S. A. Dayeh, A. V. Davydov, Nat. Nanotechnol. 2012, 7, 749. f) Q. Su, L. Chang, J. Zhang, G. H. Du, B. S. Xu, J. Phys. Chem. C 2013, 117, 4292; g) L. Luo, J. S. Wu, J. M. Xu, V. P. Dravid, ACS Nano 2014, 8, 11560; h) Y Yuan, K. Amine, J. Lu, R. Shahbazian-Yassar, Nat. Commun. 2017, 8, 15806.
[9] a) F. Wang, H.-C. Yu, M.-H. Chen, L. Wu, N. Pereira, K. Thornton, A. Van der Ven, Y Zhu, G. G. Amatucci, J. Graetz, Nat. Commun. 2012, 3, 1201; b) F. Jiang, Q. Su, H. Li, L. Yao, H. Deng, G. Du, Chem. Eng. J. 2017, 314, 301; c) S. Liu, S. Zhang, Y Xing, S. Wang, R. Lin, X. Wei, L. He, Electrochim. Acta 2014, 150, 75; d) Y Sharma, N. Sharma, G. V. S. Rao, B. V. R. Chowdari, J. Power Sources 2007, 173, 495; e) S. G. Mohamed, Y-Q. Tsai, C.-J. Chen, Y-T. Tsai, T.-F. Hung, W.-S. Chang, R.-S. Liu, ACS App. Mater. Interfaces 2015, 7, 12038; f) Y Liu, L.-J. Cao, C.-W. Cao, M. Wang, K.-L. Leung, S.-S. Zeng, T. Hung, C. Chung, Z.-G. Lu, Chem. Commun. 2014, 50, 14635; g) Q. Li, L. Yin, Z. Q. Li, X. K. Wang, Y X. Qi, J. Y Ma, ACS Appl. Mater. Interfaces 2013, 5, 10975.
[10] H. Li, P. Balaya, J. Maier, J. Electrochem. Soc. 2004, 151, A1878.
[11] Z.-S. Wu, W. Ren, L. Wen, L. Gao, J. Zhao, Z. Chen, G. Zhou, F. Li, H.-M. Cheng, ACS Nano 2010, 4, 3187.
[12] a) R. Alcántara, M. Jaraba, P. Lavela, J. Tirado, Chem. Mater. 2002, 14, 2847; b) R. Ning, J. Tian, A. M. Asiri, A. H. Qusti, A. O. Al-Youbi, X. Sun, Langmuir 2013, 29, 13146; c) W. Kang, Y Tang, W. Li, Z. Li, X. Yang, J. Xu, C.-S. Lee, Nanoscale 2014, 6, 6551; d) L. Shen, L. Yu, X. Y. Yu, X. Zhang, X. W. D. Lou, Angew. Chem. Int. Ed. 2015, 54, 1868; e) B. Liu, J. Zhang, X. Wang, G. Chen, D. Chen, C. Zhou, G. Shen, Nano Lett. 2012, 12, 3005.
[13] Q. Li, Z. Yao, J. Wu, S. Mitra, S. Hao, T. S. Sahu, Y Li, C. Wolverton, V. P. Dravid, Nano Energy 2017, 38, 342.
[14] H. S. Jadhav, S. M. Pawar, A. H. Jadhav, G. M. Thorat, J. G. Seo, Sci. Rep. 2016, 6, 31120.
[15] a) M. Thackeray, S. Baker, J. Coetzer, Mater. Res. Bull. 1982, 17, 405; b) M. Thackeray, S. Baker, K. Adendorff, J. Goodenough, Solid State Ionics 1985, 17, 175; c) D. Larcher, G. Sudant, J. Leriche, Y Chabre, J. Tarascon, J. Electrochem. Soc. 2002, 149, A234; d) H. Hwang, H. Kim, J. Cho, Nano Lett. 2011, 11, 4826.
[16] a) G. Kresse, J. Hafner, Phys. Rev. B 1993, 47, 558; b) G. Kresse, J. Hafner, Phys. Rev. B 1994, 49, 14251; c) G. Kresse, J. Furthmüller, Comput. Mater. Sci. 1996, 6, 15; d) G. Kresse, J. Furthmüller, Phys. Rev. B 1996, 54, 11169.
[17] P. E. Blöchl, Phys. Rev. B 1994, 50, 17953.
[18] J. P. Perdew, M. Ernzerhof, K. Burke, J. Chem. Phys. 1996, 105, 9982.
[19] S. Dudarev, G. Botton, S. Savrasov, C. Humphreys, A. Sutton, Phys. Rev. B 1998, 57, 1505. L. Wang, T. Maxisch, G. Ceder, Phys. Rev. B 2006, 73, 195107.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A $Li^+$ battery comprising:
an anode comprising an anode active material comprising a plurality of transition metal ($TM_1$)-substituted binary transition metal ($TM_2$) oxide nanocrystals,
a cathode in electrical communication with the anode,
a separator between the anode and the cathode, and
an electrolyte in contact with the anode and the cathode,
wherein the anode active material, in a lithiated state, is characterized by a three-dimensional network of the TM$_1$ and nanoparticles of Li$_2$O and nanoparticles of the TM$_2$, both types of nanoparticles distributed throughout the network; further wherein the anode active material, in a delithiated state, is characterized by the network of the TM$_1$ and nanoparticles of an oxide of the TM$_1$ and nanoparticles of an oxide of the TM$_2$, both types of nanoparticles distributed throughout the network; and further wherein the TM$_1$-substituted binary TM$_2$ oxide is characterized by a ratio of TM$_2$/TM$_1$ of at least about 5.

2. The Li$^+$ battery of claim 1, wherein the binary transition metal (TM$_2$) oxide has a spinel structure.

3. The Li$^+$ battery of claim 1, wherein the binary transition metal (TM$_2$) oxide is selected from Fe$_3$O$_4$, Fe$_2$O$_3$, MnO$_2$, NiO, CuO, CoO, and Co$_3$O$_4$.

4. The Li$^+$ battery of claim 3, wherein TM$_1$ is selected from Cr, Mn, Co, Fe, Ni, Cu, and combinations thereof.

5. The Li$^+$ battery of claim 1, wherein the binary transition metal (TM$_2$) oxide is Co$_3$O$_4$ and TM$_1$ is selected from Cr, Mn, Co, Fe, Ni, Cu, and combinations thereof.

6. The Li$^+$ battery of claim 1, wherein the transition metal (TM$_1$)-substituted binary transition metal (TM$_2$) is Cu-substituted Co$_3$O$_4$.

7. The Li+ battery of claim 6, wherein the ratio of TM$_2$/TM$_1$ is in a range of from about 5 to about 10.

8. The Li+ battery of claim 7, wherein the ratio of TM$_2$/TM$_1$ is about 6.

9. The Li+ battery of claim 1, wherein the ratio of TM$_2$/TM$_1$ is in a range of from about 5 to about 10.

10. The Li$^+$ battery of claim 1, wherein the nanocrystals are hexagonal in shape.

11. The Li$^+$ battery of claim 10, wherein the nanocrystals have an average maximum edge-to-edge width of less than about 100 nm.

12. The Li$^+$ battery of claim 1, wherein the nanocrystals of the anode active material, in a pristine state, are single-crystalline.

13. The Li$^+$ battery of claim 1, wherein the nanocrystals of the anode active material, in a pristine state, are characterized by a random and uniform distribution of the TM$_1$ throughout the lattice structure of the binary transition metal (TM$_2$) oxide.

14. The Li$^+$ battery of claim 1, wherein the anode and the anode active material are free of graphene and graphene oxide.

15. A method of using a Li$^+$ battery, the method comprising:
charging a Li$^+$ battery, the battery comprising
an anode comprising an anode active material comprising a plurality of transition metal (TM$_1$)-substituted binary transition metal (TM$_2$) oxide nanocrystals,
a cathode in electrical communication with the anode,
a separator between the anode and the cathode, and
an electrolyte in contact with the anode and the cathode,
wherein the anode active material, in a lithiated state, is characterized by a three-dimensional network of the TM$_1$ and nanoparticles of Li$_2$O and nanoparticles of the TM$_2$, both types of nanoparticles distributed throughout the network; further wherein the anode active material, in a delithiated state, is characterized by the network of the TM$_1$ and nanoparticles of an oxide of the TM$_1$ and nanoparticles of an oxide of the TM$_2$, both types of nanoparticles distributed throughout the network; and further wherein the TM$_1$-substituted binary TM$_2$ oxide is characterized by a ratio of TM$_2$/TM$_1$ of at least about 5; and
discharging the battery.

* * * * *